United States Patent [19]
Langlois et al.

[11] Patent Number: 5,123,523
[45] Date of Patent: Jun. 23, 1992

[54] ENDLESS CONVEYOR BELT FOR USE IN A HIGH TEMPERATURE ENVIRONMENT

[75] Inventors: Marc Langlois, Benicia; Alex Boozenny, Walnut Creek, both of Calif.

[73] Assignee: General Electric Company, Cincinnati, Ohio

[21] Appl. No.: 751,420

[22] Filed: Aug. 28, 1991

[51] Int. Cl.$^5$ .............................. B65G 15/30
[52] U.S. Cl. ................... 198/844.1; 198/817
[58] Field of Search ............ 198/804, 844.1, 817; 204/298.23, 298.25, 298.26; 432/239

[56] References Cited

U.S. PATENT DOCUMENTS

| | | | |
|---|---|---|---|
| 1,138,609 | 5/1915 | Fullerton | 198/844.1 |
| 2,251,066 | 6/1941 | Lorig | 198/844.1 |
| 2,260,587 | 10/1941 | Shields | 198/817 |
| 3,003,249 | 10/1961 | Templeton | 198/817 |
| 3,059,756 | 10/1962 | West | 198/817 |
| 3,464,537 | 9/1969 | Thull | 198/817 |
| 4,405,435 | 9/1983 | Tateishi et al. | 204/298.25 |

*Primary Examiner*—Joseph E. Valenza
*Attorney, Agent, or Firm*—John R. Rafter; Jerome C. Squillaro

[57] ABSTRACT

The present invention provides an endless conveyor belt for conveying articles within a high temperature environment, such as a sputtering apparatus. A sputtering apparatus employs endless conveyor belts mounted on power operated pulleys to convey articles within the high temperature environment of such an apparatus. The conveyor belt comprises an elongated, spring-like member having two opposed ends. The spring-like member is prevented from stretching by either a tubular wire braid within which the spring-like member is received in a close fitted engagement or, one or more cables located within the spring-like member. In case of the tubular wire braid covered spring-like member, the ends are joined by wire end loops connected to the opposed ends of the spring-like member which are in turn connected by a link. In case of the spring-like member containing one or more cables, the opposed ends of the spring-like member are connected by a threaded coupling member having a plurality of threads, threadably engaging the coils of the spring.

12 Claims, 3 Drawing Sheets

5,123,523
// 1

ENDLESS CONVEYOR BELT FOR USE IN A HIGH TEMPERATURE ENVIRONMENT

BACKGROUND OF THE INVENTION

The present invention relates to an endless conveyor belt that is used for carrying articles in high temperature environments such as are produced by sputtering equipment. More particularly, the present invention relates to such a belt in which the belt is formed from an elongated, helically wound spring having a metallic braided covering or an internal cable to prevent the spring from stretching.

In the prior art belts mounted on power driven pulleys are used to transport articles to and from high temperature process environments. As an example, thin layers of material are deposited onto such articles as automotive windshields, archetectural glass and etc., by a sputtering apparatus. The sputtering apparatus has several stations in which moisture is removed from the articles to be coated, pressure is lowered to well below atmospheric pressure, and deposition of the material is effectuated under the low pressure and at high temperature. The articles are transported in and between stations by endless belts mounted on a system of power driven pulleys Conventionally, endless belts are made of stainless steel cable covered with neoprene or fluroelastomer However, these belts tend to deteriorate or break due to the high temperature underwhich the materials are sputtered. As a result of such breakage, production must cease in order for the broken or damaged belt to be replaced. As may be appreciated, this is both time consuming and expensive.

As will be discussed, the present invention provides an endless conveyor belt for conveying articles that is ideally suited to be fabricated from materials that are more capable of withstanding a high temperature environment than prior art materials.

SUMMARY OF THE INVENTION

The present invention provides an endless conveyor belt that is suitable for fabrication from materials capable of withstanding a high temperature environment. The belt comprises an elongated, helically wound spring-like member having two opposed ends. Means are provided for joining the two opposed ends of the spring-like member to one another. Additionally, means are also provided for preventing the spring-like member from stretching.

BRIEF DESCRIPTION OF THE DRAWINGS

While the specification concludes with claims particularly pointing out and distinctively claiming the subject matter that Applicants regard as their invention, it is believed that the invention will be better understood when viewed in connection with the accompanying drawings in which:

DETAILED DESCRIPTION

Figure 1:
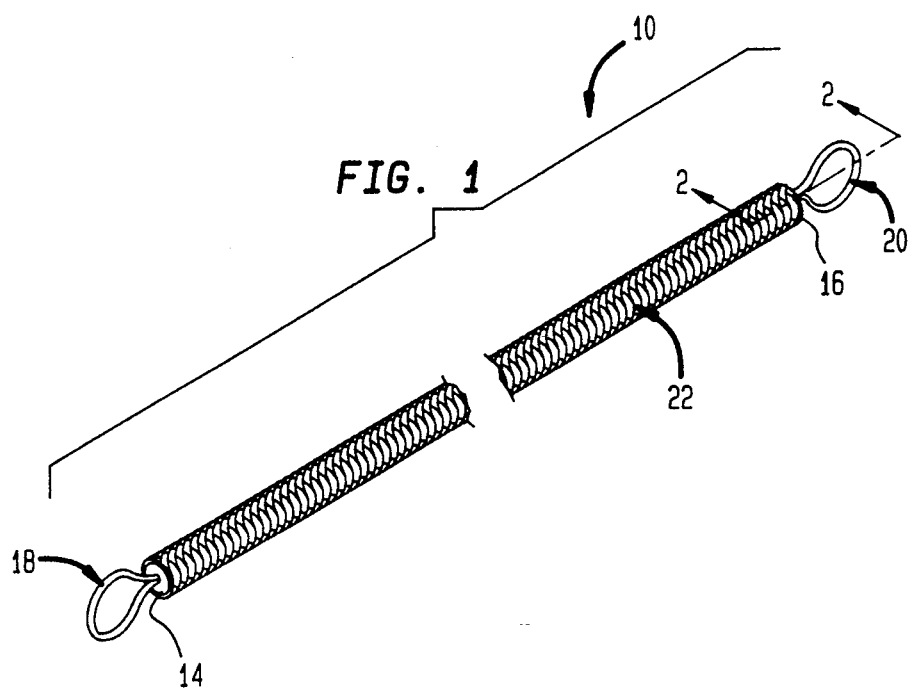
FIG. 1 is a fragmentary perspective view of a belt used in forming an endless conveyor belt in accordance with the present invention.
Figure 2:
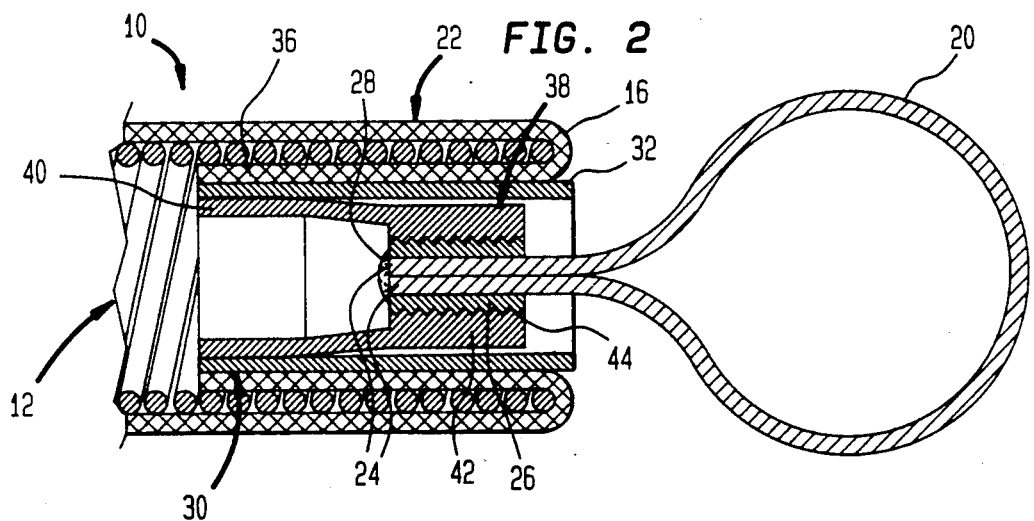
FIG. 2 is a sectional view of FIG. 1 taken long line 2—2.
Figure 3:
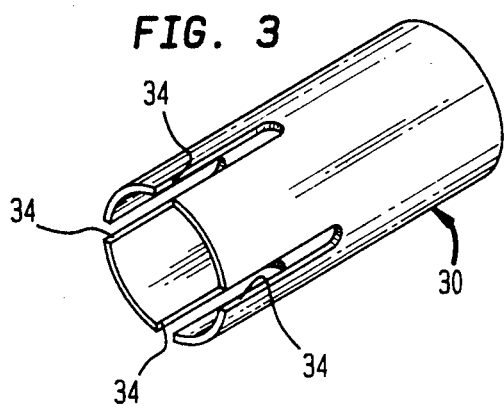
FIG. 3 is a perspective view of a slotted sleeve used in joining the ends of the belt, illustrated in FIG. 1, to one another.

With reference to FIGS. 1-3, a belt 10 used in forming an endless conveyor belt in accordance with the present invention is illustrated. Belt 10 if formed from an elongated, helically wound, spring-like member 12 and has two opposed ends 14 and 16. In order to prevent spring-like member 12 from stretching, spring-like member 12 is covered or sheathed with a tubular, wire braid 22 which closely engages spring-like member 12. As will be discussed, ends 14 and 16 of belt 10 are connected at end loops 18 and 20.

End loop 20 is fabricated from a length of 1.59 mm. piano wire which is bent into a loop. Ends 24 of end loop 20 are then extended into a threaded rod 26 and is held in place by a weld 28. Threaded rod 26 is received within a slotted sleeve 30 so as to extend from an open end 32 of slotted sleeved 30. The other end of slotted sleeve 30 has four equally spaced slots 34 to allow slotted sleeve 30 to expand against an end section 36 of tubular braid 22 which is folded inside spring-like member 12. Expansion of slotted sleeve 30 is accomplished means of an expansion body 38 having an enlarged end 40 and a relatively narrower end 42. Relatively narrower end 42 is provided with a threaded axial bore 44, within which threaded rod 26 is threadably received to hold end loop 20 in place. End loop 18 is identical to end loop 20 and is held in place in the same manner as end loop 20.

The assembly of end loop 20, slotted sleeve 30, and expansion body 38 is an follows: End section 36 of tubular wire braid 22 is folded within spring-like member 12. Expansion body 38 is then located within slotted sleeve 30. A nut is then threaded onto a machine screw which is then extended into two flat washers separated by a TEFLON washer (not illustrated). The machine screw is then extended into open end 32 of slotted sleeve 30 and screwed into threaded axial bore 44 of expansion body 38 so that one of the washers bears against slotted sleeve 30 and the other washer bears against the nut. Slotted sleeve 30, containing expander 38, is then introduced by the machine screw into end 16 of belt 10. While the machine screw is held stationery, the nut is tightened against slotted sleeve 30 to cause expansion body 38 to be drawn toward open end 32 of slotted sleeve 30. This in turn causes slotted sleeve 30 to expand outwardly, at slots 34, against inwardly folded section 36 of tubular braid 22, so that inwardly folded section 36, slotted sleeve 30 and expander 40 are held in place against the inside of spring-like member 12.

Figure 4:
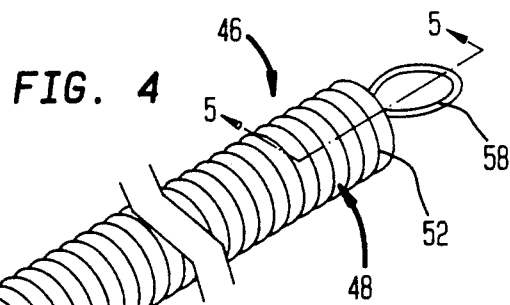
FIG. 4 is a fragmentary perspective view of an alternative embodiment of a belt used in forming an endless conveyor belt in accordance with the present invention.

With reference to FIG. 4, a belt 46 is illustrated which is an alternative embodiment used in forming an endless conveyor belt in accordance with the present invention. Conveyor belt 46 comprises an elongated, helically wound spring-like member 48. As will be discussed, spring-like member 48 is joined at its respective opposed ends 50 and 52 in forming the conveyor belt.

Figure 10:
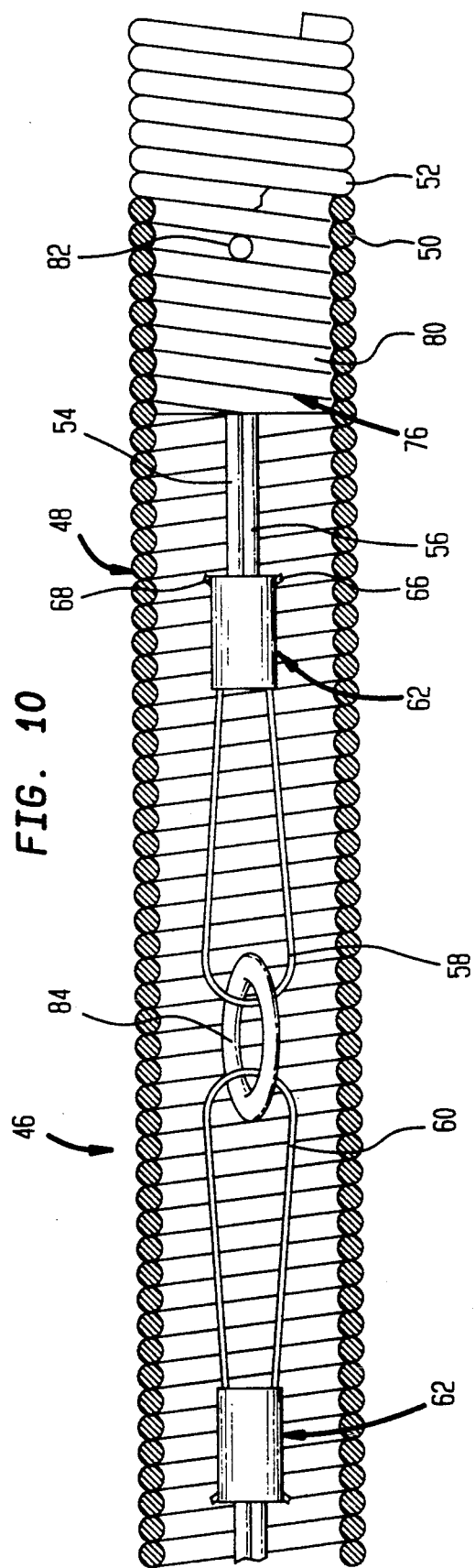
FIG. 10 is a fragmentary view of an endless conveyor belt in accordance with the present invention, with portions broken away to illustrate the connection of a double cable located within the belt to prevent the belt from stretching.

With momentary reference to FIG. 10, Spring-like member 48 is prevented from stretching by provision of two cables 54 and 56 joined at their ends by end loops 58 and 60. In this embodiment, it is important to point out that end loops 58 and 60 do not join ends 50 and 52 of spring-like member 48 to one another. Rather, as explained above, they serve in joining the paired ends of cables 54 and 56.

Figure 5:
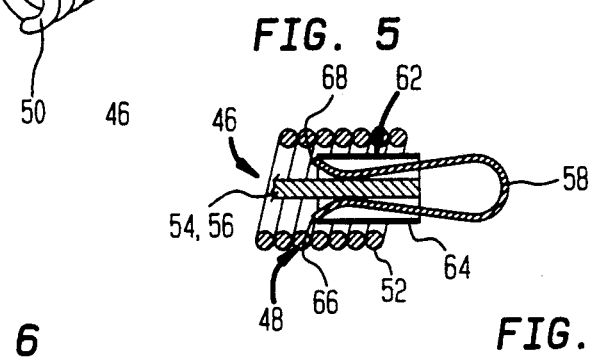
FIG. 5 is a sectional view taken along line 5—5 of FIG. 4.
Figure 6:
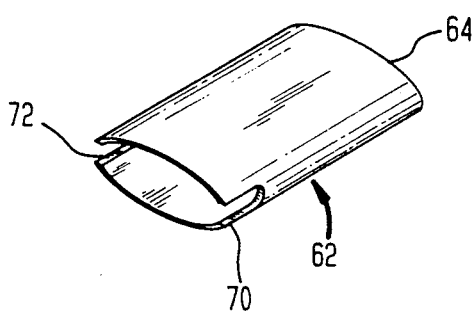
FIG. 6 is a perspective view of a flattened sleeve used in joining ends of a cable employed to prevent the belt illustrated in FIG. 4 from stretching.

With reference to FIGS. 5 and 6, end loop 58 is attached to cables 56 and 54 by means of a notched oval sleeve 62. End loop 58, again formed by 1.59 mm. piano wire, is bent into a loop shape and extended into an unnotched open end 64 of notched oval sleeve 62. End loop 58, at ends 66 and 68 thereof, pass through a pair of opposed notches 70 and 72 located at the opposite of the ends of notched oval sleeve 62. The ends of cables 54 and 56 are extended into the opposite end of notched oval sleeve 62; and afterwards, notched oval sleeve 62 is swaged to hold end loop 58, cables 54 and 56 in place. An additional notched oval sleeve 62 is provided to attach end loop 60 to the opposite paired ends of cables 54 and 56.

Figure 7:
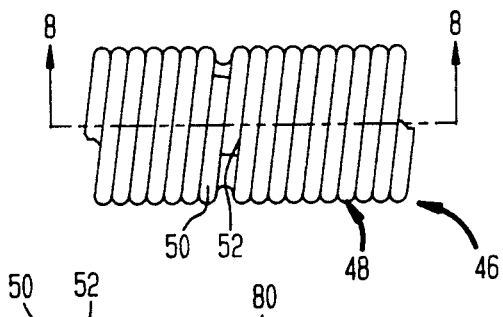
FIG. 7 is a fragmentary view of an endless conveyor belt in accordance with the present invention formed by the belt shown in FIG. 4.
Figure 8:
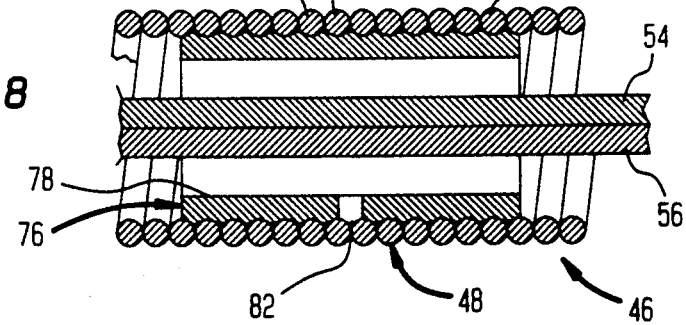
FIG. 8 is a sectional view of FIG. 7 taken along lines 8—8 of FIG. 7.
Figure 9:
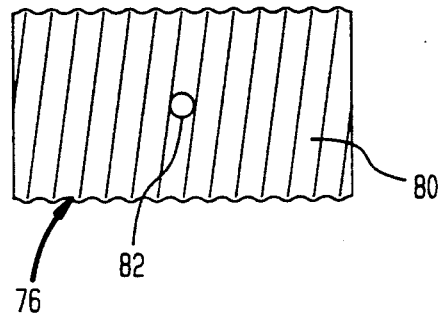
FIG. 9 is an elevational view of a threaded coupling member used in joining the ends of the belt illustrated in FIG. 4 to one another.

With reference to FIGS. 7, 8, 9, ends 50 and 52 of spring-like member 48 are joined together by a threaded coupling member 76 having an axial bore 78 to allow passage of cables 54 and 56. In this regard, it is important that axial bore 78 be of sufficient diameter to allow loops 58 and 60 and notched oval sleeves 62 to freely pass through threaded coupling member 76 in that such assembly, together with cables 54 and 56, move during travel of conveyor belt 46 on pulleys. Threaded coupling member 76 is provided with an external thread 80 of a sufficient pitch to threadably engage the coils of spring-like member 48.

Threaded coupling member 76 is also provided with a side opening 82 for purposes that will be presently discussed. With reference to FIG. 10, end loops 58 and 60 are joined within spring-like member 48 by an open link 84. It is to be mentioned that an open link 84 is also used to join end loops 18 and 20 of belt 10 in forming an endless conveyor belt in accordance with the present invention. In order to join ends 50 and 52 of spring-like member 48, threaded coupling member 76 is threaded within end 50 of spring-like member 48 with side opening 82 exposed. A rod is then extended into side opening 82 as a handle to facilitate the threading of end 52 of spring-like member 48 onto threaded coupling member 76.

Threaded coupling member 76 has other uses, depending upon the intended length of an endless belt formed in accordance with the present invention. For instance, a series of threaded coupling members, designed in the manner of threaded coupling member 76, can be used to attached several spring-like members 48, or spring-like members 12, for that matter, to one another.

As an example, spring-like members 12 and 48 can each be formed by four 9.45 meter tension springs of between about 1.19 cm. to about 1.26 cm. in diameter having coils formed from 302 INCONEL X750 wire of about 1.60 mm. in diameter. In case of spring-like member 12, the tension spring should be prestretched between about 1% to about 16% so that when sheathed, the resultant belt can bend to negotiate pulleys. The tension springs can be joined end to end by three threaded coupling members such as illustrated by threaded coupling member 76. Spring-like member 12 can then be sheathed by tubular braid having a nominal diameter of about 1.27 cm. and formed from 302 SST. In order to prevent spring-like member 48 from stretching, cables 54 and 56 fabricated from 7×19, 2.38 mm. 302 SST wire rope can be employed. The finished belts can thus be employed in high temperature and high vacuum environments because all components thereof are fabricated from stainless steel.

While a preferred embodiment of the invention has been shown and described in detail, it will readily be understood and appreciated by those skilled in the art, that numerous omissions, changes, and additions may be made without departing from the spirit and scope of the invention.

We claim:

1. An endless conveyor belt suitable for fabrication from materials capable of withstanding a high temperature environment, said belt comprising:
   an elongated, helically wound spring-like member having two opposed ends;
   means for joining the two opposed ends of the spring-like member; and
   means for preventing the spring-like member from stretching.

2. The endless belt of claim 1, wherein the stretch prevention means comprises a tubular wire braid within which the spring-like member is received in the close fitting engagement.

3. The conveyor belt of claim 1, wherein the joining means comprises:
   a pair of end loops;
   means for connecting the end loops to the two opposed ends of the spring-like member; and
   a link connecting the two end loops to one another.

4. The conveyor belt of claim 3, wherein the connection means for each of the end loops comprises:
   a slotted sleeve having, at one end, an opening from which the end loop projects, and, at the other end, a plurality of slots to allow the slotted sleeve to expand against an inwardly folded end section of the wire braid and the spring-like member so that, the slotted sleeve, wire braid and the spring-like member are held together;
   an expansion body connected, at one end, to the end loop and at the other end, having an enlarged section configured to expand the slotted sleeve, the expansion body driven into the slotted sleeve causing outward expansion of the slotted sleeve at the slots thereof.

5. The conveyor belt of claim 4, wherein the stretch prevention means comprises a tubular wire braid within which the spring-like member is received in the close fitting engagement.

6. The conveyor belt of claim 1, wherein the stretch prevention means comprises:
   at least one cable located within the spring-like member and having opposed cable ends, and
   connection means for connecting the opposed cable ends together.

7. The conveyor belt of claim 6, wherein the stretch prevention means comprises two of the at least one cables.

8. The conveyor belt of claim 7, wherein the cable connection means comprises:
two opposed end loops connected to the opposed cable ends of the two of the at least one cables; and
a link connecting the two opposed end loops together 9. The conveyor belt of claim 1, wherein the spring joining means comprises a threaded coupling member having a plurality of external threads configured to threadably engage coils of the spring-like member at the opposed ends thereof.

10. The conveyor belt of claim 9, wherein the stretch prevention means comprises:
at least one cable located within the spring-like member and having opposed cable ends, and
connection means for connecting the opposed cable ends together.

11. The conveyor belt of claim 10, wherein the stretch prevention means comprises two of the at least one cables.

12. The conveyor belt of claim 11, wherein the cable connection means comprises:
two opposed end loops connected to the opposed cable ends of the two of the at least one cables; and
a link connecting the two opposed end loops together.

* * * * *

UNITED STATES PATENT AND TRADEMARK OFFICE
CERTIFICATE OF CORRECTION

PATENT NO. : 5,123,523
DATED : June 23, 1992
INVENTOR(S) : Langlois et al

It is certified that error appears in the above-indentified patent and that said Letters Patent is hereby corrected as shown below:

ON THE TITLE PAGE:

Item [73] Assignee: delete "General Electric Company, Cincinnati, Ohio, and substitute therefor --The BOC Group, Inc., Murray Hill, New Jersey--.

Before item [57] Abstract, the "Attorney, Agent or Firm" delete "John R. Rafter; Jerome C. Squillaro" and substitute therefor --Robert I. Pearlman; David M. Rosenblum--.

Signed and Sealed this

Twenty-eighth Day of September, 1993

Attest:

BRUCE LEHMAN

Attesting Officer          Commissioner of Patents and Trademarks